US008452502B2

(12) United States Patent
Katayama et al.

(10) Patent No.: US 8,452,502 B2
(45) Date of Patent: May 28, 2013

(54) DRIVING RECORDER

(75) Inventors: Tsuyoshi Katayama, Fukuoka (JP); Akihiro Hashimoto, Otsu (JP); Hiroji Kohsaka, Kusatsu (JP); Keiko Kohsaka, legal representative, Kusatsu (JP); Masatomo Ishikura, Kyoto (JP)

(73) Assignees: Japan Automobile Research Institute, Ibaraki (JP); Horiba, Ltd., Kyoto (JP)

( * ) Notice: Subject to any disclaimer, the term of this patent is extended or adjusted under 35 U.S.C. 154(b) by 741 days.

(21) Appl. No.: 11/993,006

(22) PCT Filed: Jun. 29, 2006

(86) PCT No.: PCT/JP2006/313000
§ 371 (c)(1), (2), (4) Date: Jul. 26, 2010

(87) PCT Pub. No.: WO2007/004513
PCT Pub. Date: Jan. 11, 2007

(65) Prior Publication Data

US 2010/0318258 A1 Dec. 16, 2010

(30) Foreign Application Priority Data

Jul. 1, 2005 (JP) ................................ 2005-194458
Jul. 1, 2005 (JP) ................................ 2005-194460

(51) Int. Cl.
*G06F 17/00* (2006.01)
*B60Q 1/00* (2006.01)
*H04M 11/04* (2006.01)

(52) U.S. Cl.
USPC .......................... 701/65; 340/436; 455/404.2

(58) Field of Classification Search
USPC ............... 701/301, 41, 45, 65, 23, 70, 78, 96, 701/110, 117; 340/436, 903, 467, 435, 426.32; 342/66, 74, 82, 89, 176, 202, 357.22, 357.21, 342/454, 455, 456, 463; 180/207.3, 244, 180/325, 282; 280/28.11, 777; 455/88, 73, 455/91, 90.1–90.3, 132, 89, 572, 404.1, 404.2, 455/456.1–456.6
See application file for complete search history.

(56) References Cited

U.S. PATENT DOCUMENTS 5,948,026 A 9/1999 Beemer et al.
5,964,813 A 10/1999 Ishii et al.

(Continued)

FOREIGN PATENT DOCUMENTS

CN 1384008 12/2002
CN 1502093 6/2004

(Continued)

OTHER PUBLICATIONS

European Application No. 06767617.1 Extended Search Report dated Oct. 6, 2011, 9 pages.

(Continued)

*Primary Examiner* — Muhammad Shafi

(57) ABSTRACT

This invention intends to provide a vehicle-mounted driving recorder that can facilitate an after-the-fact analysis on not only situation data at a time of an accident but also situation data at a time of a hiyari-hatto and that can contribute accident prevention. The vehicle-mounted driving recorder comprises a data receiving section that receives situation data indicating behavior, a surrounding situation, and an operating situation of a vehicle and a data administration section that classifies the situation data into one of predetermined multiple categories based on contents of the received situation data and stores the classified situation data in a situation data storage section specified in a predetermined area of a memory.

14 Claims, 7 Drawing Sheets

U.S. PATENT DOCUMENTS

| | | | |
|---|---|---|---|
| 6,088,635 | A | 7/2000 | Cox et al. |
| 6,108,598 | A | 8/2000 | Sumitani |
| 6,141,611 | A | 10/2000 | Mackey et al. |
| 6,151,541 | A | 11/2000 | Iizuka |
| 6,163,338 | A | 12/2000 | Johnson et al. |
| 6,185,490 | B1 | 2/2001 | Ferguson |
| 6,246,933 | B1 * | 6/2001 | Bague .......................... 701/32.2 |
| 6,246,934 | B1 | 6/2001 | Otake et al. |
| 6,266,588 | B1 | 7/2001 | McClellan et al. |
| 6,324,450 | B1 | 11/2001 | Iwama |
| 6,356,824 | B1 | 3/2002 | Chene et al. |
| 6,438,472 | B1 * | 8/2002 | Tano et al. ................... 701/29.6 |
| 7,203,581 | B2 | 4/2007 | Okada |
| 7,965,312 | B2 | 6/2011 | Chung et al. |
| 2002/0035422 | A1 | 3/2002 | Sasaki |
| 2002/0177931 | A1 | 11/2002 | Iwasaki et al. |
| 2003/0033062 | A1 | 2/2003 | Nishina |
| 2003/0154009 | A1 | 8/2003 | Basir et al. |
| 2004/0113763 | A1 | 6/2004 | Bendavid et al. |
| 2005/0131597 | A1 | 6/2005 | Raz et al. |
| 2005/0190619 | A1 * | 9/2005 | Wakiyama .................... 365/201 |
| 2005/0251297 | A1 * | 11/2005 | Dery et al. ......................... 701/2 |
| 2006/0184295 | A1 | 8/2006 | Hawkins et al. |
| 2008/0161995 | A1 | 7/2008 | Nakajima et al. |
| 2011/0066317 | A1 | 3/2011 | Lee |

FOREIGN PATENT DOCUMENTS

| | | | |
|---|---|---|---|
| EP | 1 059 508 | | 12/2000 |
| EP | 1 548 653 | | 6/2005 |
| JP | 60-29753 | | 2/1985 |
| JP | 63-265383 | | 11/1988 |
| JP | 1-39245 | | 11/1989 |
| JP | 05-197858 | | 8/1993 |
| JP | 06-044430 | | 2/1994 |
| JP | 08-169284 | | 7/1996 |
| JP | 09-050547 | | 2/1997 |
| JP | 09-062885 | | 3/1997 |
| JP | 09-231422 | | 9/1997 |
| JP | 10-250642 | | 9/1998 |
| JP | 11-183182 | | 7/1999 |
| JP | 2000-043764 | | 2/2000 |
| JP | 2000-092420 | | 3/2000 |
| JP | 2000-194895 | | 7/2000 |
| JP | 2000-309287 | | 11/2000 |
| JP | 2001-106123 | | 4/2001 |
| JP | 2001-124585 | | 5/2001 |
| JP | 2003-069936 | | 3/2003 |
| JP | 2003-168882 | | 6/2003 |
| JP | 2003-252256 | | 9/2003 |
| JP | 2004-064634 | | 2/2004 |
| JP | 2004-075033 | | 3/2004 |
| JP | 2004-240828 | | 8/2004 |
| JP | 2004-318912 | | 11/2004 |
| JP | 2004-345599 | | 12/2004 |
| JP | 2005-500931 | | 1/2005 |
| JP | 2006-352391 | | 12/2006 |
| JP | 2007-011909 | | 1/2007 |
| JP | 2001-055175 | * | 2/2012 |

OTHER PUBLICATIONS

Japanese Application No. 2005-194458 Office Action dated Jun. 21, 2011, 3 pages (no translation).

Japanese Application No. 2005-194458 Decision to Grant a Patent dated Dec. 4, 2012, 3 pages.

* cited by examiner

DRIVING RECORDER

FIELD OF THE ART

This invention relates to a driving recorder that records behavior, a surrounding situation or the like of a motor vehicle during a certain period before and after a time of an accident or a hiyari-hatto, in other words, a case when a driver feels chill because he or she is close to be involved in an accident even though this situation does not reach an accident in case an accident occurs or a driver feels chill because of the above reason, and that can preferably makes an after-the-fact analysis why the motor vehicle gets involved in the situation.

BACKGROUND ART

Recently, a vehicle-mounted driving recorder has been developed that can automatically record an image of outside or inside of a motor vehicle (an automobile) during driving and that can make an after-the-fact analysis on an objective situation at a time of an accident or a hiyari-hatto, in other words, at a time when a driver feels chill because he or she is close to be involved in an accident, and there is a trend that this kind of driving recorder is mounted on, for example, a taxicab in order to prevent an accident by making the after-the-fact analysis on an ordinary driving or to collect an objective evidence of a cause of the accident when the accident occurs.

Concretely, the driving recorder of this type is mounted on a vehicle, and so arranged to sequentially and chronologically store situation data such as outside image data, acceleration data, speed data and position data while the vehicle is driving in a memory so that an after-the-fact analysis can be made by reference to the situation data stored in the memory.

In order to record this situation data (store this situation data in a memory), conventionally known are an arrangement wherein all of the situation data during driving is stored until the capacity of the memory runs out, an arrangement of, so-called a ring-buffer memory method wherein the oldest situation data is updated in sequence when the capacity of the memory runs out, and an arrangement wherein, a hiyari-hatto, an accident or an abnormality is considered to occur at a time when an acceleration (a deceleration) of the vehicle shows above a certain numerical value, the situation data alone during a certain period before and after the time of the event is recorded in a nonvolatile memory to use the situation data for after-the-fact analysis from a transient memory (refer to the patent document 1).

With the above-mentioned conventional driving recorder, however, since the situation data during an ordinary driving is also recorded as well as the situation data at a time of an accident and at a time of a hiyari-hatto, it becomes difficult to make an after-the-fact analysis. More specifically, since the former two conventional driving recorders record all of the situation data, it becomes extremely difficult to extract the situation data at a time of a hiyari-hatto that is difficult to specify the timing unlike an accident.

In addition, with the later conventional driving recorder, since a lot of unnecessary situation data is obtained because the acceleration sensor reacts to a movement of just opening or closing the door or a quick acceleration or deceleration due to a driver's preference although a certain level of filtering is provided by the acceleration, it becomes very troublesome to select unnecessary situation data after the event.

A driving recorder that selects and stores only the situation data whose importance is high in a recording media generally uses acceleration data as a trigger for detection and the situation data before and after a time when the acceleration is detected in case the acceleration is bigger than a certain level is stored in the recording media (Patent document 1).

If the acceleration data is used as the trigger for detection, however, there is a problem of failing to record the situation data relating to a minor accident wherein the acceleration is small.

Patent document 1: Japan patent laid open number 5-197858

DISCLOSURE OF THE INVENTION

Problems to be Solved by the Invention

The present claimed invention mainly intends to provide a vehicle-mounted driving recorder that can make an after-the-fact analysis easily and accurately on not only the situation data at a time of accident but also the situation data at a time of a hiyari-hatto and that can contribute to prevention of accidents or to provide a driving recorder that can accurately record the situation date relating to the accident.

Means to Solve the Problems

More specifically, the vehicle-mounted driving recorder in accordance with this invention is characterized by comprising a data receiving section that receives situation data indicating behavior, a surrounding situation, an operating situation or the like of a vehicle and a data administration section that classifies the situation data into one of predetermined multiple categories based on contents of the received situation data and stores the classified situation data in a situation data storage section specified in a predetermined area of a memory.

The categories may be specified according to an event that is estimated to have occurred such as, for example, an accident and a hiyari-hatto, may be specified in the order of importance of record and may be specified in accordance with a combination of the above or other category system. In addition, to classify is an operation to store the situation data into a folder (a category) specified in the situation data storage section, or an operation to give an identifier to each situation data according to the category.

In order to judge whether an accident occurs or a hiyari-hatto occurs, or to judge the importance of record, acceleration data indicating acceleration applied to a vehicle, position data indicating a position of the vehicle, speed data indicating a speed of the vehicle, brake data indicating whether or not a brake of the vehicle is activated, door open/close data indicating whether a door is open or closed and main electric power supply state data indicating whether or not electric power is supplied from an electric power supply at a side of the vehicle may be used in complex as the situation data.

More specifically, it is possible to automatically classify and record the situation data depending on what criterion among the previously determined criteria to which the combination of the contents of multiple situation data corresponds.

More concretely, for example, in case that the vehicle makes a quick stop without brakes, a possibility of an accident is extremely high. Then, the situation data before and after this event is set to be in a category of, for example, an accident and the most important. In case that acceleration exceeding a certain level continues for more than a certain period and after that driving is restarted without opening or closing the door, a possibility of a hiyari-hatto is high. Then, the situation data before and after this event is set to be in a category of, for example, a hiyari-hatto and important.

As a result, in accordance with this arrangement, since the situation data is automatically classified at a time of recording, it is possible to make an after-the-fact analysis accurately and easily. In addition, in case that a capacity of a memory runs out, the situation data whose importance is lower is automatically updated in turn to the situation data whose importance is higher and the important data will not be erased, which enables effective use of the memory without erasing important situation data.

Conventionally, in case of a taxicab, the situation data is stored in a detachable nonvolatile memory (a CF memory card or the like) and, for example, the nonvolatile memory is pulled out from the recorder and then loaded on a center computer in a vehicle allocating center after the completion of work so as to transfer the situation data into a memory in the center computer. However, with this arrangement, there might be a case that the situation data in the CF memory card is updated at a time of a next driving due to a human error such as forgetting the operation of pulling out the detachable nonvolatile memory.

In order to solve this problem, it is preferable that a communication device that radio-transmits the situation data in the situation data storage section to a center computer arranged at a place different from the place where the vehicle locates at a time when the vehicle locates in a specified place where radio-communication to the center computer is capable.

The situation data especially effective for making the after-the-fact analysis on the contents of the accident or the hiyari-hatto, although this overlaps the data at a time of recording or making a judgment, is represented by acceleration data indicating acceleration applied to the vehicle, position data indicating a position of the vehicle and moving image data indicating an outside picture of the vehicle.

In addition, in order to judge whether or not the event is an accident or a hiyari-hatto more accurately it is preferable that the situation data further includes at least one of or all of speed data indicating a speed of the vehicle, brake data indicating whether a brake is applied to the vehicle or not, door open/close data indicating whether a door is open or closed and main electric power supply state data indicating whether or not electric power is supplied from a power supply at a side of the vehicle.

Furthermore, the vehicle-mounted driving recorder in accordance with this invention comprises a detection device that detects a situation of a vehicle, a data administration section that determines whether or not there is a selection signal that is generated due to an operation of the vehicle by a driver after an occurrence of an accident, and a situation data storage section that stores situation data of the vehicle, and is characterized by that the situation data storage section is so arranged to select and to store the situation data of the vehicle before and after the selection signal is generated in case that the data administration section determines the selection signal is generated. The selection signal generated by operating the vehicle by the driver after the occurrence of the accident is a signal generated by an action such as opening or closing a door, yanking an emergency brake or turning off an ignition switch that would be conducted after the driver recognizes the occurrence of the accident.

Regardless of a size of an accident, if an accident occurs, a driver generally gets out of the car by opening the door in order to confirm the damage by the accident. As a result, in accordance with the driving recorder having this arrangement, since opening or closing the door of the vehicle is specified as the judging criterion to make a choice of the situation data by making use of behavior of the driver, it is possible to detect with high accuracy a minor accident which might be failed to be recorded when a magnitude of the acceleration is specified as the judging criterion.

In addition, in case that a vehicle accident happens, the driver is generally supposed to yank an emergency brake before opening a door. As a result, it is possible to detect a minor accident with high accuracy if an operation of yanking an emergency brake is specified as the judging criterion to select the situation data in stead of an operation of opening or closing the door or in addition to the operation of opening or closing the door.

In addition, in case that it is judged to take much time to handle an accident after checking on the damage of the vehicle accident, the driver is supposed to turn off the ignition switch. As a result, if an event of turning off the ignition switch is used as a judgment criterion for selecting the situation data, it is possible to detect a minor accident with high accuracy.

However, there is a case that the driver yanks an emergency brake, turns of an ignition switch, opens a door and gets out of a vehicle just for taking a rest or for a shift. As a result, in case that a necessity of storing the situation data is low, it is preferable to comprise a manual switch that generates a release signal by operating the manual switch so that storing the situation data in the situation data storage section can be cancelled by a driver's judgment.

In addition, in case of a minor accident such as a minor collision, in order to make it possible to record the situation data by a driver's judgment for preventing loss of the situation data, the driving recorder may comprise a manual switch that outputs an indication signal to store situation data of the vehicle and a data administration section that determines whether the manual switch is turned on or turned off, and the situation data storage section is so arranged to store the situation data of the vehicle before and after the manual switch is turned on in case that the data administration section determines the manual switch is turned on.

Effect of the Invention

In accordance with this invention, since the situation data is automatically classified at a time of recording, it is possible to make an after-the-fact analysis very easily and accurately. In addition, if data whose importance is lower is automatically updated at a time when the capacity of the memory runs out, it is possible to effectively use the memory without erasing important data. Furthermore, since the behavior that is highly possibly conducted by a driver at a time when an accident occurs is specified as a judgment criterion to select the situation data, it is possible to detect with high accuracy a minor accident which might be failed to be recorded in case that the magnitude of the acceleration is specified as the judgment criterion and to record its situation data relating to the accident without fail.

EXPLANATION OF THE REFERENCE NUMERAL

1 . . . driving recorder, 801 . . . data receiving section, 802 . . . temporary data storage section, 803 . . . situation data storage section, 804 . . . data administration section

BEST MODES OF EMBODYING THE INVENTION

<First Embodiment>

A first embodiment of the present claimed invention will be described with reference to the accompanying drawings.

Figure 1:
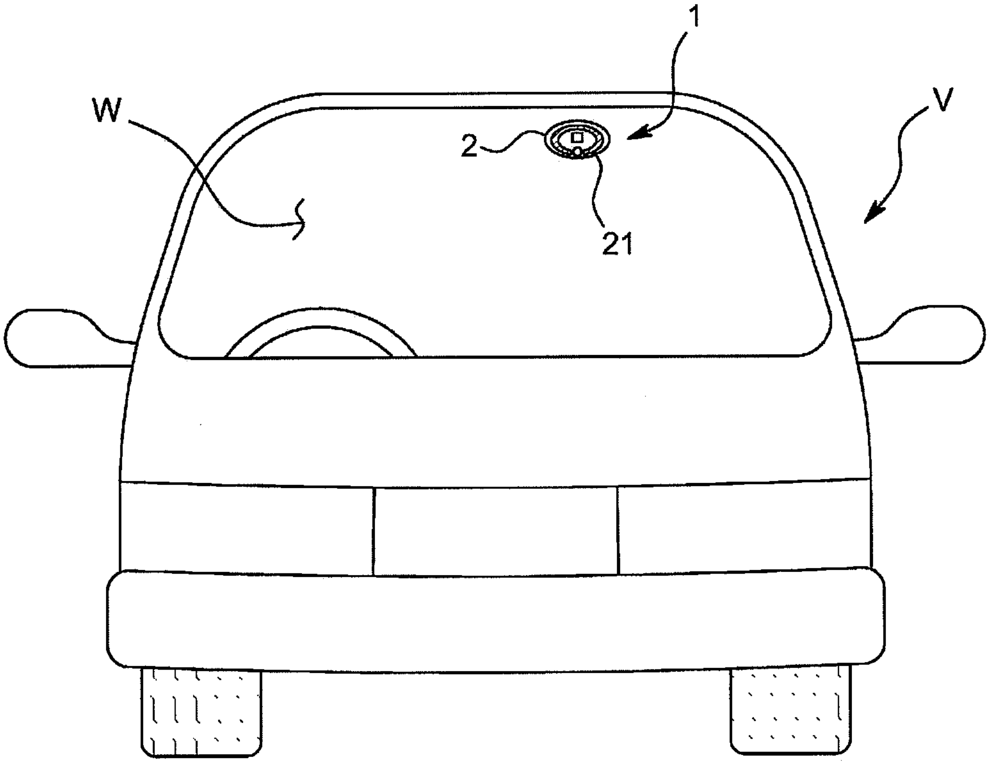
FIG. 1 is a pattern front view showing a case that a driving recorder in accordance with the first embodiment of this invention is mounted on a vehicle.

A driving recorder 1 in accordance with this embodiment is, as shown in FIG. 1, to record behavior, a surrounding situation or the like of a motor vehicle V during a certain period before and after a time of an accident or a hiyari-hatto, in other words, a time when a driver feels chill because he or she is close to be involved in an accident, and comprises a single casing 2, a detection device 3, an alert device 4, an input device 5, a communication device 6, a removable recording device 7, an information processing device 8 and an auxiliary electric power supply 9 held by the casing 2. The driving recorder 1 is attached to an arbitrary place on an automobile windshield W through an adhesive pad 21 having predetermined heat conductivity.

Next, each part will be described.

Figure 2:
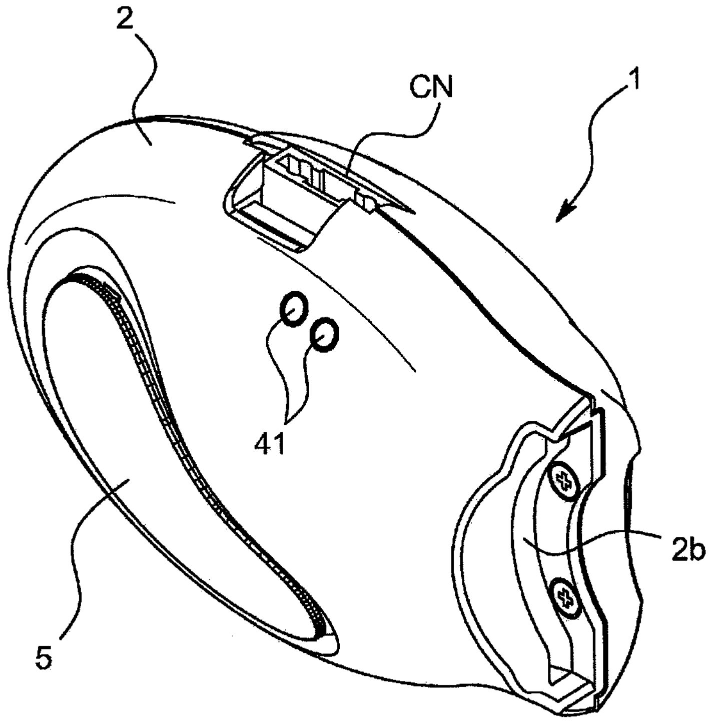
FIG. 2 is a perspective view of the driving recorder in accordance with this embodiment viewed from inside of the vehicle.
Figure 3:
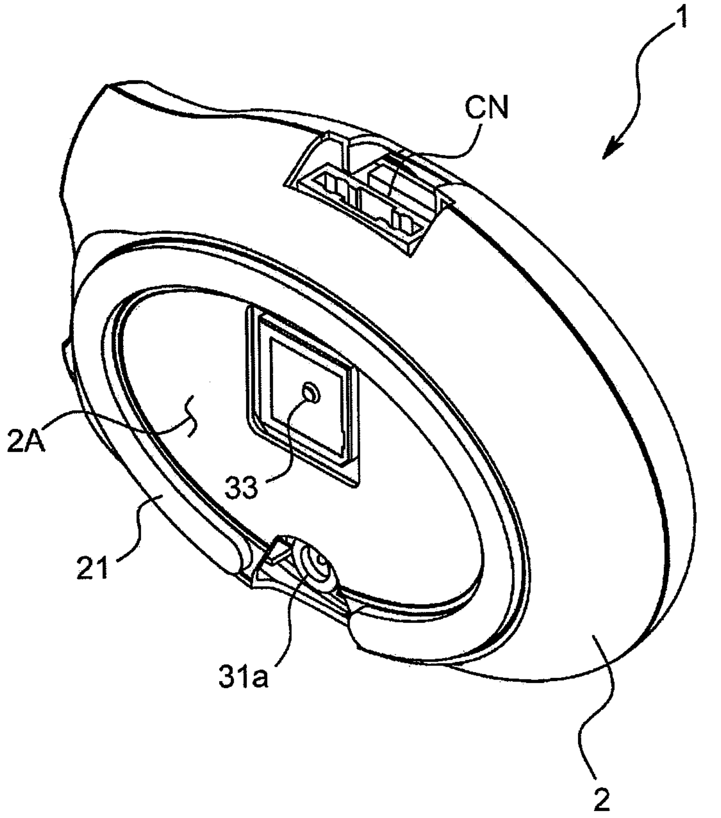
FIG. 3 is a perspective view of the driving recorder in accordance with this embodiment viewed from outside of the vehicle.

The casing 2 is, as shown in FIG. 2 and FIG. 3, of a generally egg-shaped form almost all of which is made of a metal (a magnesium alloy), wherein a flat surface part 2A of a generally elliptical shape formed by cutting a part of the egg-shaped form with a flat surface is arranged in a part of the casing 2 and an outer circumferential edge part of the flat surface part 2A is attached to the automobile windshield W through the adhesive pad 21 of a generally elliptic zonation having adherence and elasticity.

Figure 4:
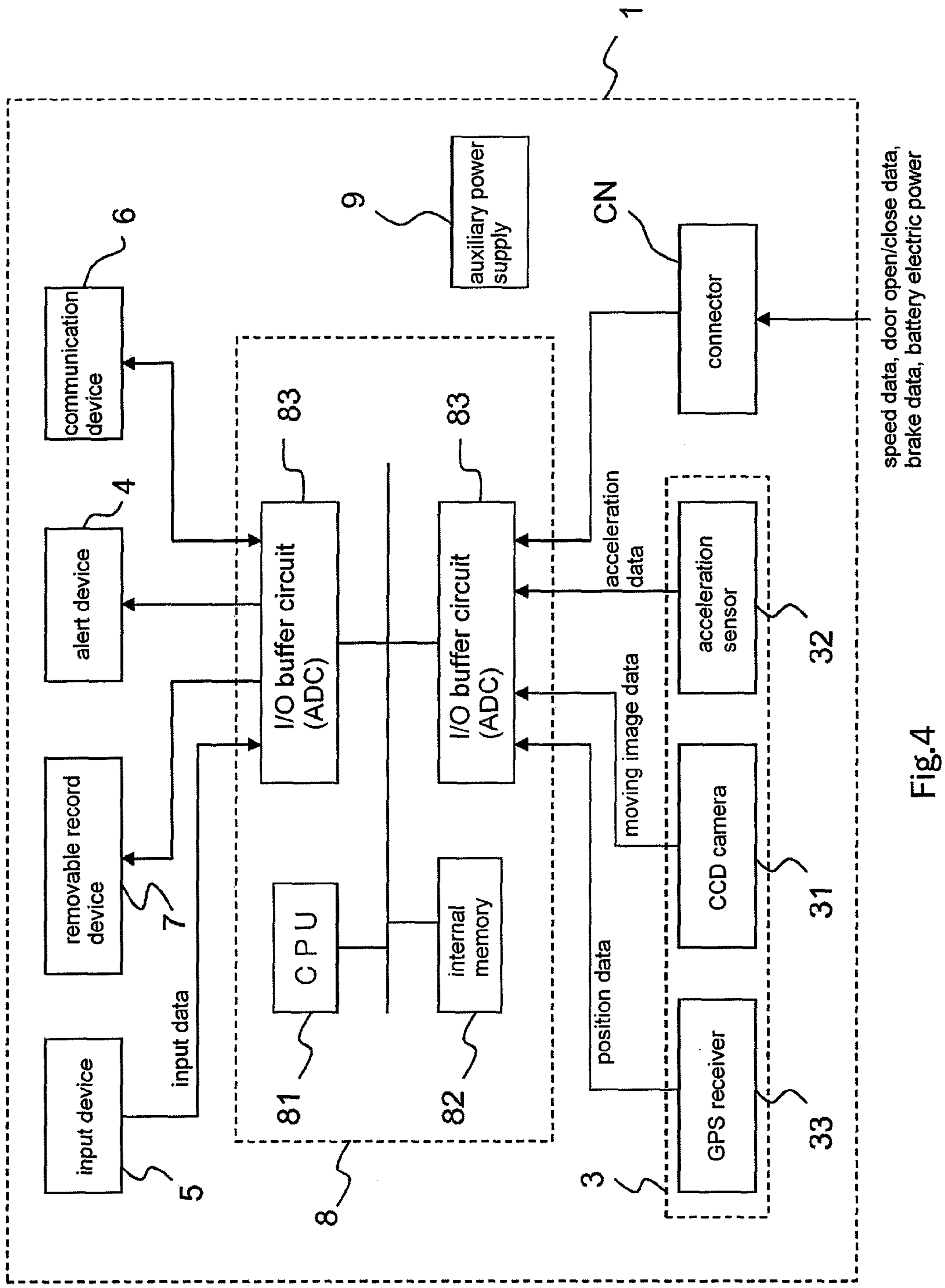
FIG. 4 is a pattern structural view of the driving recorder in accordance with this embodiment.

The detection device 3, as shown in FIG. 4, senses the behavior, the surrounding situation, the operating condition or the like of the motor vehicle V and outputs situation data indicating contents of the behavior, the surrounding situation, the operating condition or the like. The detection device 3 uses at least a CCD camera 31 as being an imaging device, an acceleration sensor 32 and a GPS receiver 33 as being a position sensor.

The CCD camera 31 takes an image of a situation of outside the vehicle V and outputs the situation data indicating the image (the moving image data in this embodiment, however, it may be still image data), and an image reception area 31*a* is exposed to the casing flat surface part 2A that faces the automobile windshield W. The image reception area 31*a* is movable so that it can be set to face to a desired direction to take the image in accordance with a position, on which the CCD camera 31 is mounted, of the automobile windshield W.

The acceleration sensor 32 is of an arrangement that makes use of, for example, a Piezoresistance effect, and senses acceleration of one dimension to three dimensions (back and front, right and left, up and down, for example, in case of three dimensions) that applies to the motor vehicle V and outputs the situation data (the acceleration data) indicating its acceleration. The acceleration in this embodiment may be an absolute value and includes deceleration.

The GPS receiver 33 catches electromagnetic waves from, for example, multiple satellites (artificial satellites), senses a position of the motor vehicle V on which the driving recorder 1 is mounted and outputs the situation data (position data) indicating the position of the motor vehicle V, and a part of the GPS receiver 33 is exposed to, for example, the casing flat surface part 2A.

The situation data is vehicle speed data transmitted from a vehicle speed sensor (not shown in drawings) of the motor vehicle V, door open/close data indicating an opening and closing of a door, or brake data indicating ON/OFF of a brake, and the data is received through a connector CN.

Furthermore, the driving recorder 1 is generally activated by the electric power supplied from a vehicle battery (an electric power supply at a side of the vehicle, not shown in drawings) through the connector CN. In case that an electric power supply from the vehicle battery becomes scarce due to some cause (in case that the battery gets damaged due to a crash accident or the like), electric power supply source to the driving recorder 1 is automatically switched to the auxiliary electric power supply 9 and the auxiliary electric power supply 9 supplies electric power enough to drive the driving recorder 1 at the minimum during at least the certain period. This makes it possible to record the situation data of the vehicle. Then whether or not the electric power is supplied from the battery of the vehicle is input as main electric power supply state data as being one of the situation data to the information processing device 8, to be described later.

The alert device 4 comprises, as shown in FIG. 2, LEDs 41 as being an illuminant exposed to an opposite side of the casing flat surface part 2A and a sound output body (not shown in drawings) such as a buzzer or a speaker built-in the casing 2. If a judged result, for example, that the acceleration detected by the acceleration sensor 32 exceeds a predetermined criterion, is transmitted from the data administration section 804, the alert device 4 reports the judged result to a driver by means of light or sound.

The input device 5 is a button switch (a manual switch) exposed to an opposite side of the casing flat surface part 2A.

The communication device 6 is hardware for wireless LAN that is built-in the casing 2 and that sends and receives various data by means of a center computer (not shown in drawings) arranged in a vehicle allocating center and the electromagnetic waves.

In this embodiment, the removable recording device 7 is a CF memory card detachably mounted on a slot 2*b* opening toward a lateral side of the casing 2 and records the situation data stored in the situation data storage section 803 if required.

Figure 5:
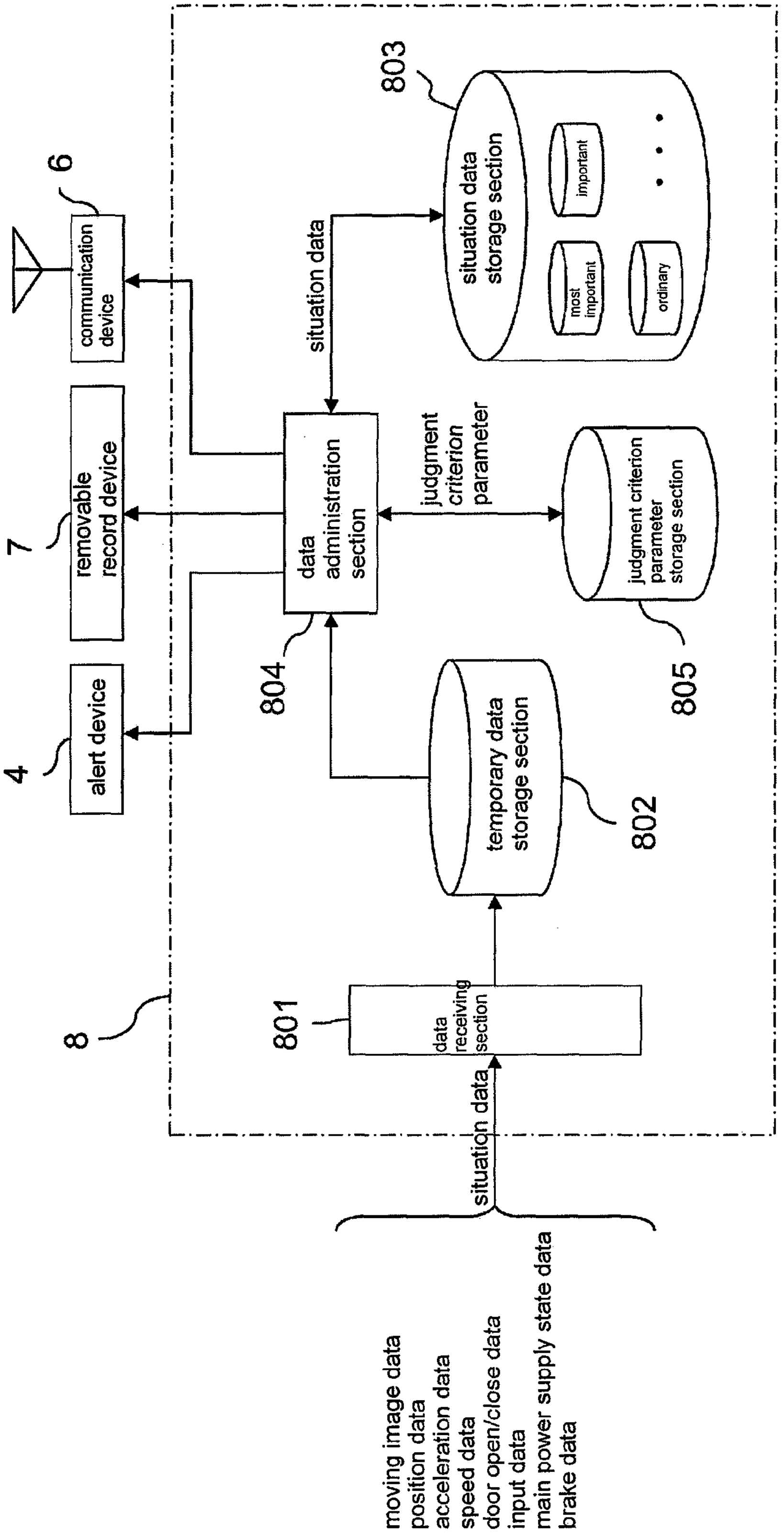
FIG. 5 is a functional block diagram of an information processing device in accordance with this embodiment.

The information processing device 8 is, as shown in FIG. 4, structurally a so-called computer circuit that is built-in the casing 2 and that has a CPU 81, an internal memory 82 (for example, a nonvolatile memory) and an I/O buffer circuit 83 (there might be a case that an AD converter is included). As shown in FIG. 5, each device is controlled or information processed by operating the CPU 81 in accordance with programs stored in a predetermined area of the internal memory 82, and functions as a data receiving section 801, a temporary data storage section 802, a situation data storage section 803, a data administration section 804 and a judgment criterion parameter storage section 805.

The data receiving section 801 receives the situation data as being data concerning the behavior, the surrounding situation or the like of the motor vehicle V at a constant sampling time one after another in a chronological order and writes the received situation data one after another in the temporary data storage section 802 set in a predetermined area of the internal memory 82. If a capacity of the temporary data storage section 802 runs out, old data is sequentially erased and new situation data is written in the temporary data storage section 802.

The data administration section 804 determines whether or not the content of the situation data stored in the temporary data storage section 802 meets the predetermined condition. Only in a case that the content meets the predetermined condition, the situation data during a certain period before and after the situation data whose content meets the predetermined condition is transferred from the temporary data storage section 802 to the situation data recording section 803 arranged in the internal memory 82 or/and a predetermined area of the removable recording device 7.

In this embodiment, a judgment criterion parameter that is arranged to correspond to each situation data is used in order to judge whether or not the content meets the predetermined condition. The judgment criterion parameter is stored in advance in the judgment criterion parameter storage section 805 arranged in a predetermined area of the internal memory 82.

Then the value (the content) of each situation data is, for example, digitalized in accordance with the judgment criterion parameter. Concretely, all are digitalized; whether or not the acceleration (deceleration) exceeds a predetermined judgment criterion, whether or not the acceleration continues for more than or equal to a certain period, whether or not the door is open, whether or nor the electric power is supplied from the battery, whether or not the speed of the vehicle exceeds the predetermined upper limit speed, whether or not the speed of the vehicle is not over the predetermined lower limit speed and whether or not the brake is applied.

Later, whether or not the content of each situation data meets the predetermined condition is judged based on results of the digitalized values on which a logical operation such as an AND/OR operation is performed. Some may be judged by combining a content of the situation data with a content of other situation data depending on the variety or the content of the situation data and some may be judged based on a content of a single situation data. For example, in this embodiment, if the electric power is not supplied from the battery, it is instantly judged based on the single event that the predetermined condition is satisfied. If the door is left open, it is instantly judged based on the single event that the predetermined condition is satisfied. Meanwhile, concerning the acceleration, it is judged that the predetermined condition is satisfied at a time when two events are satisfied; both the acceleration data exceeds the predetermined judgment criterion and the acceleration data continues over a certain period.

In this embodiment, in case that it is judged the predetermined conditioned is satisfied (in case that it is judged a hiyari-hatto or an accident occurs), the data administration section 804 reports the driver about this event by means of light or sound by the alert device 4 and verifies the judgment by means of, for example, input data (this is also one of the situation data) from the driver with an operation of ON/OFF of the button switch 5. The driver can input that the accident or the hiyari-hatto occurs by voluntarily pushing the button switch 5, even though there is no report from the alert device 4.

Then the situation data during a certain period is transferred from the temporary data storage section 802 to the situation data storage section 803 only after the driver determines the situation as the hiyari-hatto or the accident and pushes the button switch 5 and then the data administration section 804 receives the input data indicating that the hiyari-hatto or the accident occurs. The difference between the temporary data storage section 802 and the situation data storage section 803 is; the temporary data storage section 802 temporarily stores the situation data irrespective of the contents of the situation data while the situation data storage section 803 stores the situation data for the record basically without updating the situation data and the situation data is updated after being transferred to other record device (for example, the detachable record device 7).

In addition, in this embodiment, the data administration section 804 further has a learning function that learns a content of a predetermined condition and updates it, a classificatory function that classifies the situation data stored in the situation data storage section 803 in accordance with a type or a level of importance of the situation, and an automatic transmission function that automatically transmits the situation data to a center computer (not shown in drawings) through the communication device 6.

In case that the predetermined condition is judged to be satisfied and in case that the input from the driver is inconsistent with the actual condition, the learning function is a function to grasp a driving preference of the driver and to update the predetermined condition by the feedback of this case, more concretely, to update a value of the judgment criterion parameter or the logical operational expression such as the AND/OR operation. For example, if a driver tends to press a brake pedal hard, a situation usually judged as the hiyari-hatto can be considered as an ordinary driving because a value of the judgment criterion parameter in accordance with the acceleration gradually gets higher than a default value due to this learning function, thereby eliminating accumulation of useless data.

The data classificatory function is a function to weight the situation data during a certain period to be recorded based on the contents of the situation data at a time of recording and to classify, organize and store the situation data into folders (classifications) arranged in the situation data storage section 803 in the order of the importance of the record, for example, the most important, important and ordinary. As one example, in case that the vehicle V makes a quick stop without a brake, it is considered that a probability of the accident is extremely high, and then the situation data during a certain period before and after the time of the event is recorded in a file of, for example, the most important. In addition, in case that the driver voluntarily pushes the button switch 5, the situation data is also recorded in the folder of the most important. Furthermore, for example, if an acceleration exceeding a certain level continues for more than a certain period, followed by that driving is restarted without opening or closing the door, there is a probability of a hiyari-hatto and then the situation data before and after this time is recorded, for example, in the important folder.

In case that the capacity of the situation data storage section 803 runs out, the situation data whose importance is lower than the importance of new situation data is automatically erased and the new situation data is recorded instead.

The automatic transmission function is especially helpfully used for, for example, taxicabs or buses. More specifically, in case that the motor vehicle V is in a specified place such as a vehicle allocating center, the automatic transmission function automatically or manually opens a wireless line to a center computer locating in the vehicle allocating center and transmits the situation data in the situation data storage section 803 in association with the motor vehicle V or an identifier of a driver of the motor vehicle V through the communication device 6.

With the driving recorder 1 in accordance with this embodiment having this arrangement, since the situation data is automatically classified in the order of importance and stored in the situation data storage section 803 by the data classificatory function, it is possible to conduct an after-the-fact analysis extremely smoothly by transmitting the classified situation data to, for example, a center computer and analyzing them. Furthermore, in case that the capacity of the situation data storage section 803 runs out, the situation data whose importance is lower is updated in turn and the situation data whose importance is higher remains, which makes it possible to effectively use the memory.

In addition, since the case considered to be the accident or the hiyari-hatto is judged based on multiple contents shown by each situation data and a sequence of the situation data during a certain period after and before this case is stored (can be said as recorded) only in this case, it is possible to omit useless situation data appropriately compared with a case wherein all of the situation data is stored or a case wherein the accident or the hiyari-hatto is judged based on a single content among the contents of the situation data. As a result, it is possible to effectively utilize the memory. In addition, since the useless situation data is omitted, it is possible to obtain an effect that the after-the-fact analysis becomes easy.

Furthermore, since the driving preference at a time of the accident or the hiyari-hatto is learned individually in accordance with a driver's characteristics and a predetermined condition data as being a criterion for judgment is updated based on the learned driving preference, it is possible to eliminate useless situation data and to obtain the situation data at a time of the accident or the hiyari-hatto without fail compared with a case that the predetermined condition data is defined uniformly.

In addition, since the situation data in the situation data storage section 803 at a time when the vehicle V locates in a specified place is automatically transmitted to and stored in the other center computer by the automatic transmission function, it is possible to prevent loss of the situation data due to forgetting pulling out the detachable record device 7, and also possible to eliminate the use of the detachable record device 7 itself depending on a case-by-case basis.

<Second Embodiment>

Next, a second embodiment of the present claimed invention will be explained with reference to drawings. The same parts or the corresponding parts as those in the first embodiment are denoted by the same reference numerals as those in the first embodiment.

An equipment configuration of the driving recorder 1 in accordance with this embodiment is generally the same as that of the driving recorder in accordance with the first embodiment. In this embodiment, the data administration section 804 comprises a judging section 8041 and a data transporting section 8042, and a manual switch 5 as being the input device comprises a manual switch A51 and a manual switch B52.

Figure 6:
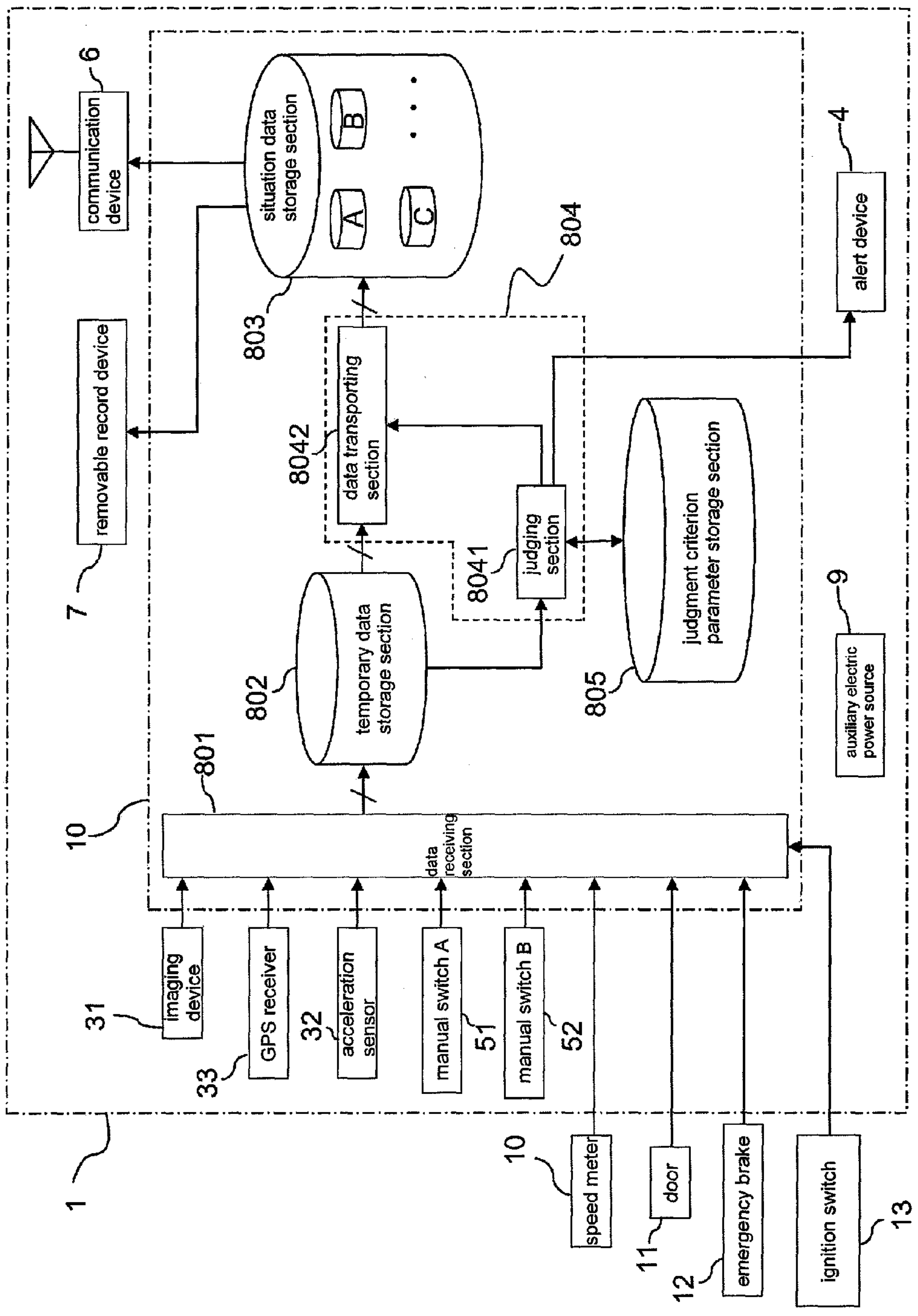
FIG. 6 is a functional block diagram of a driving recorder in accordance with the second embodiment of the invention.

A constituent element of the driving recorder 1 in accordance with this embodiment, whose detail is shown in FIG. 6, a detection device 3 that detects a situation of a vehicle, more specifically, an imaging device 31 that takes images of the situation surrounding the vehicle, a GPS receiver 33 that detects a position of the vehicle, and an acceleration sensor 32 that detects acceleration applied to the vehicle, a data receiving section 801 that receives the data detected by the detection device 3, a temporary data storage section 802 that temporarily stores the data sent from the data receiving section 801, a judging section 8041 that determines whether or not the door 11 is open or closed, whether or not an emergency brake is yanked, or whether or not a selection signal that generates at a time when an ignition switch 13 is turned off is contained, a judgment criterion parameter storage section 805 that stores data of the parameter relating to the selection signal to be a judgment criterion in the judging section 8041, an alert section 4 that reports the driver that the selection signal is contained in the situation data in case that the judging section 8041 judges the selection signal is contained in the situation data, the manual switch A51 that is operated by the driver who receives the report at a time when the driver judges there is no need of saving the situation data, the manual switch B52 that is operated by the driver at a time when the driver judges the situation data be saved although the driver receives no report from the alert section 4, the data transportation section 8042 that transports the situation data stored in the temporary data storage section 802 according to an instruction from the judging section 8041, the data storage section 803 that stores the situation data transported from the data transportation section 8042, the communication device 6 that transmits the situation data stored in the situation data storage section 803 to the outside, the detachable record device 7 that records the situation data stored in the situation data storage section 803, and the auxiliary electric power supply 9.

Furthermore, the data receiving section 801 receives data also from a automobile speed meter 10 incorporated into the vehicle, the door 11, the emergency brake 12 and the ignition switch 13, and the data is received through the connector CN. In addition, the connector CN is also used for the electric power supply.

Each section will be explained in detail. The imaging device 31 uses, for example, a CCD camera that can take moving images. The GPS receiver 33 detects a position of the vehicle on which the GPS receiver 33 is mounted based on a signal sent from an artificial satellite. The acceleration sensor 32 makes use of, for example, a Piezoresistance effect and senses the acceleration applied to the vehicle in one-dimension to three-dimension (for example, toward the front and the back, the right and the left, and the upside and the downside in case of three-dimension).

The temporary data storage section 802 stores the data detected by the detection device 3 incorporated into the driving recorder 1 or the data emitted from the automobile speed meter 10, the door 11, the emergency brake 12 or the ignition switch 13 sequentially and updates the data one after the other at a time when the capacity thereof runs out.

The judging section 8041 judges whether or not a selection signal that generates at a time when the door 11 is open or closed, the emergency brake 12 is yanked, an ignition switch 13 is turned off is contained, and if the selection signal is contained, its result is transmitted to the alert device 4.

If the result that the selection signal is contained in the situation data is transmitted from the judging section 8041, the alert device 4 reports it to the driver by means of light or sound. The alert device 4 comprises LEDs 171 as being an illuminant exposed to a surface of the casing CA and a sound output body (not shown in drawings) such as a buzzer or a speaker built-in the casing CA.

The manual switch 5 is a button switch arranged on the surface of the casing CA. In case that the driver who is reported from the alert device 4 that the selection signal is contained in the situation data by means of light or sound judges there is no need of storing the situation data because the selection signal is caused by just taking a rest or a shift of the driver, the driver turns on the manual switch 5 to transmit a release signal to give an instruction to cancel storing the situation data in the situation data storage section 803.

The judgment criterion parameter storage section 805 stores data of the parameter to be a judgment criterion at a time to judge whether or not the selection signal is generated because the door 11 is open or closed, the emergency brake 12 is yanked or the ignition switch 13 is turned off.

The data transporting section 8042 transports the situation data of the vehicle stored in the temporary data storage section 802 to the situation data storage section 803 based on the instruction from the judging section 8041.

In case that the judging section 8041 judges that the selection signal is contained in the situation data, the judging section 8041 outputs a signal to the data transporting section 8042 to instruct the data transporting section 8042 transport the situation data of the vehicle stored in the temporary data storage section 802 to the situation data storage section 803. In case that a release signal to cancel storing the situation data is transmitted from the manual switch A51 to the judging section 8041, no signal to transport the situation data of the vehicle to the situation data storage section 803 is output.

The situation data storage section 803 stores the situation data of the vehicle stored in the temporary data storage section 802 and received through the data transporting section 8042.

The detachable record device 7 uses, for example, a CF card detachably mounted on a slot 2*b* that opens toward a lateral direction of the casing CA or a hard disk. The detachable record device 7 records the situation data stored in the situation data storage section 803 as required.

The communication device 6 uses a wireless LAN, and transmits the situation data stored in the situation data storage section 803 to an office or the like in case that the vehicle on which the driving recorder 1 in accordance with this embodiment is mounted is, for example, a commercial vehicle such as a taxicab.

Usually the driving recorder 1 is supplied with electric power from a battery loaded on the vehicle, however, in case that the battery gets damaged due to a crash accident or the like, the auxiliary power supply 9 supplies electric power to the driving recorder 1 so as to make it possible to record the situation data of the vehicle.

In case that the selection signal is not detected from the situation data due to some sort of cause or in case that the driver turns on the manual switch B52 by himself or herself just after the driver recognizes an occurrence of the accident, the manual switch B52 transmits a signal to instruct the judging section 8041 to store the situation data in the situation data storage section 803. The manual switch B52 is not shown in FIG. 2.

The data receiving section 801, the temporary data storage section 802, the data transporting section 8042, the situation data storage section 803, the judging section 8041 and the judgment criterion parameter storage section 805 are constituted by the information processing device 8. The information processing device 8 has a CPU 81, an internal memory 82 and an AD converter 83. The information processing device 8 functions as the data receiving section 801, the temporary data storage section 802, the situation data storage section 803, the data administration section 804 (the judging section 8041 and the data transporting section 8042) and the judgment criterion parameter storage section 805 by operating the CPU 81 and its peripheral devices according to programs set in a predetermined area of the internal memory 82. The information processing device 8 may be multipurpose or dedicated.

The operation of the driving recorder 1 having this arrangement will be explained.

Figure 7:
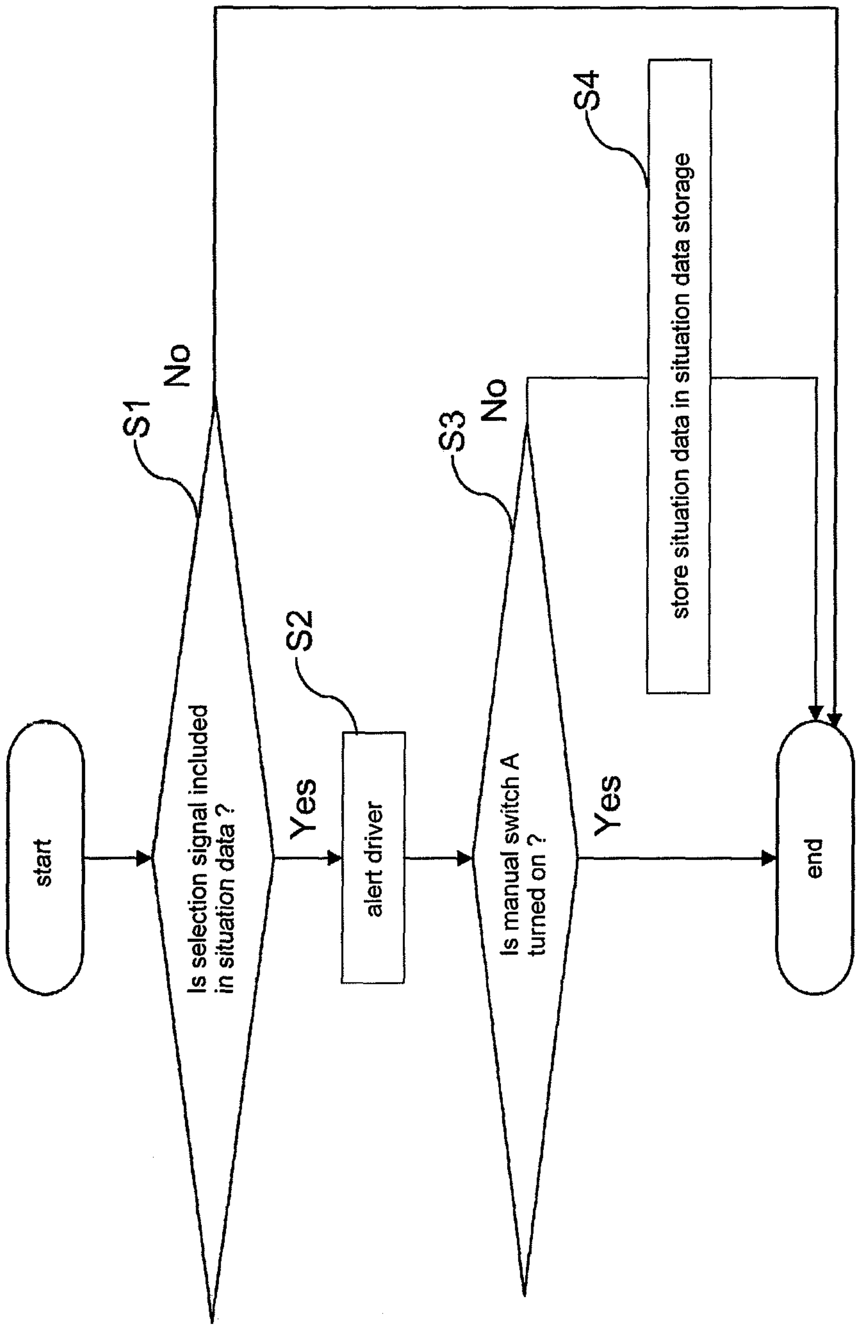
FIG. 7 is a flow chart showing a performance of the driving recorder in accordance with this embodiment.

The situation data of the vehicle such as the continuously taken image data is first stored in the temporary data storage section 802. When a new situation data is stored in the temporary data storage section 802, the judging section 8041 judges whether or not the selection signal is contained in the new situation data (step S1) as shown in FIG. 7. If judged that the selection signal is contained in the situation data, the judging section 8041 outputs a signal to the alert device 4 so as to report the driver and the alert device 4 reports the driver that the selection signal is detected by means of light or sound (step S2). When the driver who receives the report from the alert device 4 judges that the selection signal is generated by just taking a rest or a shift of the driver, the driver turns on the manual switch A51. When the driver judges that the selection signal is generated by a minor accident, the driver does not turn on the manual switch A51. The judging section 8041 judges whether or not the manual switch A51 is turned on (step S3). If judged that the manual switch A51 is not turned on (remains off), the image data for several dozen seconds before and after the time when the selection signal is generated among the moving images or the continuously taken still images such as 30 frames per second is transported to the data storage section 803 and stored in the situation data storage section 803 (step S4). A time length of the situation data stored in the situation data storage section 803 can be set arbitrarily.

In accordance with this embodiment, since the behavior that the driver is highly likely to conduct at a time when an accident occurs is specified as the judgment criterion to make a choice of the situation data, it is possible to detect with high accuracy a minor accident which might be failed to be recorded in case that the magnitude of the acceleration is specified as the judgment criterion and to record its situation data relating to the accident. In addition, in case that the selection signal is generated by just taking a rest or a shift of the driver, since obtaining the situation data can be canceled by operating the manual switch A51 to be turned on, it is possible to avoid unnecessary data from being stored.

This invention is not limited to the above-mentioned embodiment. For example, the situation data obtained by the driving recorder may include information on a brake such as a time period while the brake pedal is pressed and a number of times to press the brake pedal or information on operation of a blinker.

In addition, the situation data storage section may store the situation data just in a chronological order without classifying the situation data in an order of importance.

What is judged by the judging section 8041 is not limited to whether or not there is the selection signal, and an appropriate combination of the acceleration, the speed and halt of the electric power supply from a main electric power supply (battery) may be used as a judgment criterion whether or not the situation data is to be recorded. In addition, the situation data may be classified in an order of importance by using combined parameters resulting from multiple events and stored separately, for example, in a folder whose importance is high (for example, the most important folder (storage section A)) and in a folder whose importance is low (for example, the ordinary folder (storage section B)) in the situation data storage section 803.

It is a matter of course that the present claimed invention may be variously modified without departing from the spirit of the invention.

Possible Applications In Industry

In accordance with this invention, it is possible to provide a vehicle mounted driving recorder that can make an after-the-fact analysis easily on not only situation data at a time of an accident but also situation data at a time of a hiyari-hatto, in other words, when a driver feels chill because he or she is close to be involved in an accident and that can contribute to prevention of accidents, and to provide a driving recorder that can accurately select and record the situation date relating to the accident.

The invention claimed is:

1. A vehicle-mounted driving recorder comprising
   a housing with a first surface complying in shape with a vehicle windshield and supporting an adhesive member for mounting the housing by the first surface on the vehicle windshield and a second surface having an operator activated input device,
   wherein the housing structure contains therein a global position sensor, an accelerator sensor, a camera for recording video images, an auxiliary electric power supply, an operator alert device, a removable record device, and an information processing device connected to the position sensor, acceleration sensor, camera, auxiliary electric power supply and removable recording device and configured to receive, analyze and store signals and provide data to a data receiving section and a data administration section;
   the data receiving section receives situation data from the information processing devise indicating behavior, a surrounding situation, and an operating situation of a vehicle; and
   the data administration section classifies the situation data into one of predetermined multiple categories based on contents of the received situation data and stores the classified situation data in a situation data storage section specified in a predetermined area of a memory in the removable record device.

2. The vehicle-mounted driving recorder described in claim 1, wherein
   the categories are specified in the order of importance of record.

3. The vehicle-mounted driving recorder described in claim 1, and further comprising:
   a communication device that radio-transmits the situation data in the situation data storage section to a center computer arranged at a place different from the place where the vehicle locates at a time when the vehicle locates in a specified place where radio-communication to the center computer is capable.

4. The vehicle-mounted driving recorder described in claim 1, wherein
   the situation data includes at least acceleration data indicating acceleration applied to the vehicle, position data indicating a position of the vehicle and moving image data indicating an outside picture of the vehicle.

5. The vehicle-mounted driving recorder described in claim 4, wherein
   the situation data further includes speed data indicating a speed of the vehicle, brake data indicating whether a brake pedal is applied or not, door open/close data indicating whether a door is open or closed, activating of an emergency brake, and main electric power supply state data indicating whether or not electric power is supplied from an electric power supply at a side of the vehicle.

6. The vehicle-mounted driving recorder of claim 1 wherein the second surface is opposite the first surface and the operator activated input device is an enlarged manual switch, extending substantially across the second surface to provide a relatively large activation surface for a driver.

7. A driving recorder comprising:
   a detection device that detects a situation of a vehicle,
   a data administration section that determines whether or not there is a selection signal that is generated due to an operation of the vehicle by a driver after an occurrence of an accident, and
   a situation data storage section that stores situation data of the vehicle, wherein the situation data storage section is so arranged to select and to store the situation data of the vehicle before and after the selection signal is generated in case that the data administration section determines that the selection signal is generated, and
   the section signal is generated by opening or closing a door, or yanking an emergency brake, or turning off an ignition switch.

8. The driving recorder described in claim 7, wherein
   the selection signal is generated by opening or closing a door.

9. The driving recorder described in claim 7, wherein
   the selection signal is generated by yanking an emergency brake.

10. The driving recorder described in claim 7, wherein
   the selection signal is generated by turning off an ignition switch.

11. The driving recorder described in claim 7, and comprising a manual switch that generates a release signal by operating the manual switch in case of canceling to store the situation data of the vehicle in the situation data storage section.

12. The driving recorder described in claim 7, and comprising a manual switch that generates a release signal by operating the manual switch in case of cancelling the storage of the situation data of the vehicle in the situation data. storage section.

13. A driving recorder comprising:
   a housing with a first surface complying in shape with a vehicle windshield and supporting an adhesive member for mounting the housing by the first surface on the vehicle windshield and a second surface having an operator activated input device,
   wherein the housing structure contains therein a global position sensor, an accelerator sensor, a camera for recording video images, an auxiliary electric power supply, an operator alert device, a removable record device, and an information processing device connected to the position sensor, acceleration sensor, camera, auxiliary electric power supply and removable recording device and configured to receive, analyze and store signals and provide data to a data receiving section and a data administration section;
   the data receiving section receives situation data from the information processing devise indicating behavior, a surrounding situation, and an operating situation of a vehicle; and
   the data administration section classifies the situation data into one of predetermined multiple categories based on contents of the received situation data and stores the classified situation data in a situation data storage section specified in a predetermined area of a memory in the removable record device;
   a detection device that detects a situation of a vehicle, a manual switch that outputs an indication signal to store situation data of the vehicle,
   the data administration section that determines whether the manual switch is turned on or turned off, and the situation data storage section that stores situation data of the vehicle, wherein the situation data storage section is so arranged to store the situation data of the vehicle before and after the manual switch is turned on in case that the data administration section determines that the manual switch is turned on.

14. The vehicle-mounted driving recorder of claim 13 wherein the second surface is opposite the first surface and the operator activated input device is an enlarged manual switch, extending substantially across the second surface to provide a relatively large activation surface for a driver.

* * * * *